US005531331A

United States Patent [19]

Barnett

[11] Patent Number: 5,531,331

[45] Date of Patent: Jul. 2, 1996

[54] SORTING OF DIFFERENTLY IDENTIFIED ARTICLES

[76] Inventor: Adam J. Barnett, Hilltop, 26 Graham Road, Paignton, Devon, United Kingdom

[21] Appl. No.: 190,096

[22] PCT Filed: Aug. 4, 1992

[86] PCT No.: PCT/GB92/01450

§ 371 Date: Feb. 2, 1994

§ 102(e) Date: Feb. 2, 1994

[87] PCT Pub. No.: WO93/02814

PCT Pub. Date: Feb. 18, 1993

[30] Foreign Application Priority Data

Aug. 6, 1991 [GB] United Kingdom .................. 9116912

[51] Int. Cl.[6] .......................... B07C 5/342; B65G 17/32

[52] U.S. Cl. ........................ 209/580; 209/912; 209/919; 198/397

[58] Field of Search .................................. 209/580, 581, 209/587, 588, 651, 912, 917, 919; 198/393, 396, 397; 221/163, 164

[56] References Cited

U.S. PATENT DOCUMENTS

| | | | |
|---|---|---|---|
| 3,017,184 | 1/1962 | Gruss | 198/397 X |
| 3,556,282 | 1/1971 | Moeltzner | 198/397 |
| 3,565,248 | 2/1971 | Messerschmidt | 209/919 X |
| 4,308,942 | 1/1982 | Ackley | 221/173 X |
| 4,660,710 | 4/1987 | Swapp et al. | 198/397 |
| 4,879,025 | 11/1989 | Sharpcott | 209/559 |
| 5,060,782 | 10/1991 | Marti | 198/397 X |

FOREIGN PATENT DOCUMENTS

| | | | |
|---|---|---|---|
| 3906084 | 9/1989 | Germany | B07C 5/02 |
| 63-315465 | 12/1988 | Japan | B65H 43/00 |
| 1219172 | 3/1986 | U.S.S.R. | 209/919 |
| 2061490 | 5/1981 | United Kingdom | B07C 5/342 |
| 9104803 | 4/1991 | WIPO | B07C 5/342 |

OTHER PUBLICATIONS

Patent Abstracts of Japan vol. 13, No. 154 (M–814) 14 Apr. 1989.

*Primary Examiner*—Joseph E. Valenza
*Assistant Examiner*—Tuan Nguyen
*Attorney, Agent, or Firm*—David P. Gordon

[57] ABSTRACT

An apparatus is disclosed for sorting differently identified articles, in particular for sorting differently colored gaming chips. The apparatus includes a rotating transfer disc arranged to remove individual chips from a random store and transfer them to a conveyor. The conveyor carries the chips first to a sensor which is arranged to sense the color of the chip and then to a chip ejector which is arranged to remove the chips from the conveyor and deposit them in a respective one of several containers depending on the color of the chip.

21 Claims, 3 Drawing Sheets

SORTING OF DIFFERENTLY IDENTIFIED ARTICLES

BACKGROUND OF THE INVENTION

This invention relates to apparatus for sorting of differently identified articles, and in particular to apparatus capable of sorting differently coloured gaming chips.

U.K. patent specification 2061490 discloses apparatus for sorting differently coloured gaming chips where a plurality of photodetectors are used to detect the colour of chips on a conveyor and separate them into corresponding storage compartments.

I have now devised an alternative and improved apparatus for sorting differently identified articles.

SUMMARY OF THE INVENTION

According to a first aspect of the invention, there is provided apparatus for sorting a plurality of differently identified gaming chips, said apparatus comprising transfer means arranged to remove individual ones of said chips from a store of randomly arranged chips and transfer said chips in sequence to conveyor means, said conveyor means being arranged to carry said chips in sequence first to sensing means arranged to sense the identifiable characteristic of said individual chips, and subsequently to chip ejector means arranged to remove individual ones of said chips from said conveyor means and deposit individual said chips in a respective selected one of a plurality of receptacles depending on the characteristic of said individual chip identified by said sensing means.

Typically the gaming chips are disc like, and typically the identifiable characteristic of the gaming chips are their colour. For example, in a set of fifty gaming chips, ten may be black, ten blue, ten red, ten yellow, and ten white.

It is preferred that the transfer means is in the form of a circular disc rotatable around a central axis perpendicular to the plane of the disc. Advantageously, the plane of the disc is inclined at an acute angle to the horizontal. Typically the circular disc is provided with a plurality of formations, preferably projecting formations, proximate the periphery of the disc and spaced circumferentially thereabout. Advantageously these formations are arranged to carry individual ones of the chips from said store along an arcuate path to said conveyor means.

Typically a plurality of pairs of pins are provided around the peripheral portion of the disc, with each pair of pins being arranged to carry an individual chip.

It is preferred that the disc is rotatably driven by a motor, and that the speed of the motor and hence the speed of rotation of the disc is adjustable.

Advantageously the apparatus is provided with a deflector means arranged to lift individual ones of said chips from said first transfer means and position said chips in/on said conveyor means. In a preferred embodiment according to the first aspect of the invention the deflector means may be in the form of an elongate finger member or the like arranged to lift and deflect said chips from the surface of the rotating disc. Advantageously, a circular groove or slot is provided proximate the periphery of the disc within which the distal end of the finger member may be received.

It is preferred that the conveyor means comprises a plurality of chip collector apertures adapted to collect and retain individual ones of said chips. Typically one or more resilient members are provided around the collector aperture to aid retention of the chip therein. Typically, when the chips are in the form of discs, the collection apertures are circular and may be provided with a resilient peripheral plastics or rubber member to aid retention of the chip discs therein. Advantageously, the collector apertures in the conveyor means are arranged such that the chip may enter and be located in the aperture from one side of the aperture, and be ejected through the opposed side of the aperture.

Typically the conveyor comprises a plurality of linked, preferably substantially square or rectangular elements, each element being provided with an individual chip retaining aperture. Advantageously the conveyor elements are pivotally linked such that adjacent elements may pivot relative to one another.

It is preferred that the conveyor is caused to move by connection to an electric motor. Advantageously, the speed of the conveyor means and transfer means is monitored and controlled by suitable microprocessor control means such that the speed of the conveyor means and the speed of the transfer means (being the tangential velocity of the disc where the first transfer means is a disc) is maintained substantially identical.

Advantageously, the path followed by the conveyor means is substantially square or rectangular having one pair of opposed paths substantially parallel to the plane of the rotatable disc and the other pair of opposed paths substantially perpendicular (and therefore upwardly/downwardly sloping) to the plane of the rotatable discs.

It is preferred that the chip ejector means comprises an array of chip ejectors arranged in side by side relationship, advantageously adjacent the uppermost path of the conveyor means substantially facing the circular rotating disc. Typically a corresponding receptacle is provided adjacent each chip ejector with the path of the conveyor means lying intermediate the chip ejector and respective receptacle.

Advantageously, the chip ejectors are actuated by means of an actuation signal provided by signal processing means acting on the output signal from the sensing means. Since the sensing means is able to identify the identifiable characteristic of each chip as it passes in sequence, and since the speed of the conveyor means is measured, microprocessor control may be used to correctly actuate respective chip ejectors when chips exhibiting the required characteristic are adjacent the correct receptacle. Typically the chip ejectors are solenoid actuated.

Particularly where the identifiable characteristic of the chips are their various individual colours, the sensing means may advantageously be a charge coupled device arranged to produce a digital output dependent on the colour of the chip being sensed. This digital output may then be stored in a suitable processor and used to actuate the chip ejector means.

According to the second aspect of the invention therefore there is provided means for identifying colour characteristics of a sequence of differently coloured moving articles comprising directing light in turn at individual moving articles in said sequence and causing light reflected therefrom to impinge on a charge coupled device arranged to produce a digital output signal dependent on the colour characteristic of said article, and storing said digital output.

The invention will now be further described in a specific embodiment by way of example only with reference to the accompanying drawings:

DETAILED DESCRIPTION OF THE PREFERRED EMBODIMENT

Figure 1:
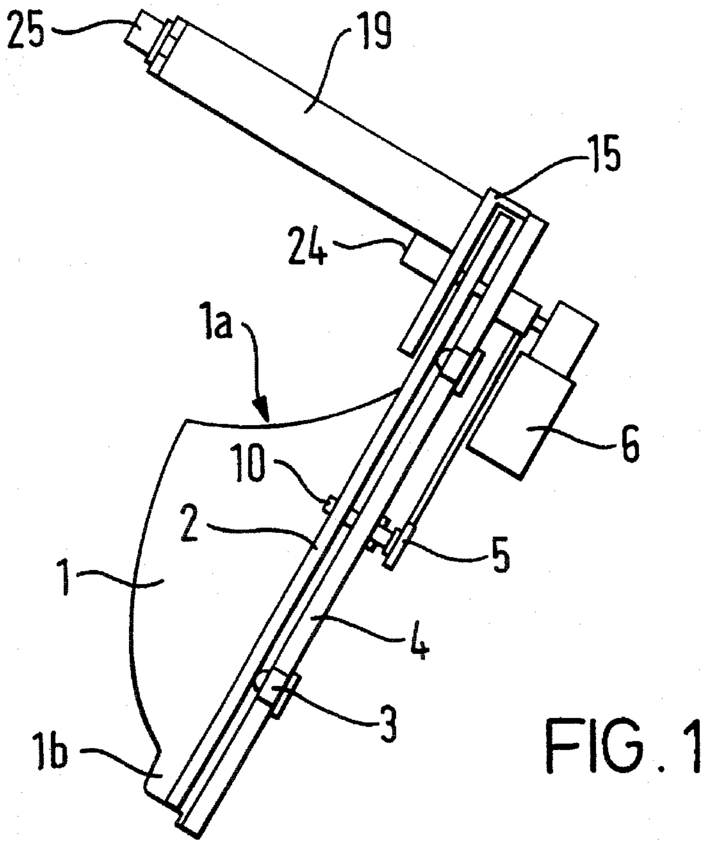
FIG. 1 is a side elevation of apparatus according to the first aspect of the invention.

Referring to the drawings, and initially to FIG. 1 in particular, the apparatus comprises an open topped hopper 1 which is fixed to a stationary sloping support plate 4. A circular disc 2 is supported on bearings 3 and is rotatable on a driven shaft 10 which passes through the support plate 4. The shaft 10 is rotated by means of suitable gearing connected to the driving motor 6.

Figure 2:
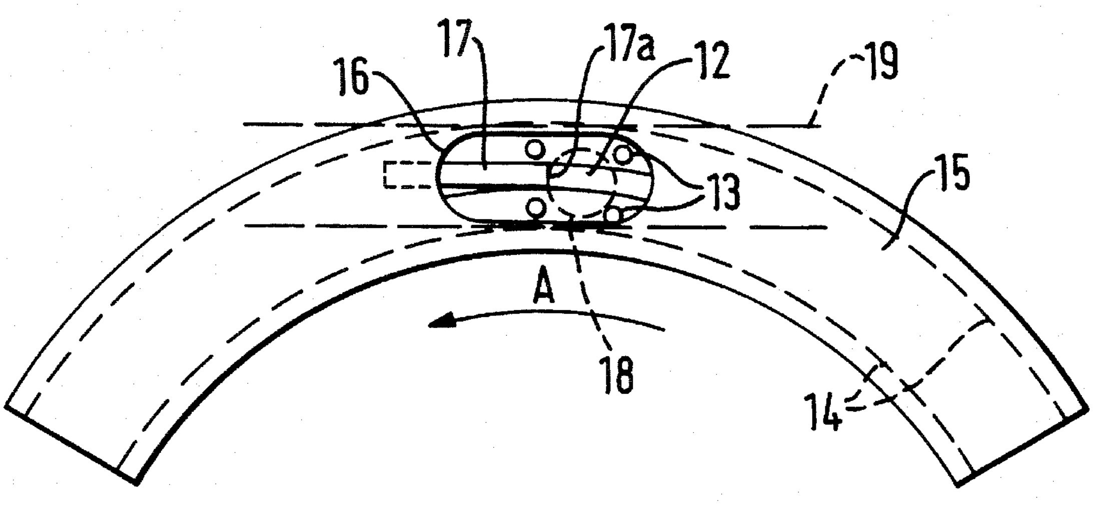
FIG. 2 is a view of a part of the apparatus of FIG. 1.

The rotatable circular disc 2 is provided with a peripheral circumferential rectangular slot 12 either side of which slot at spaced intervals around the circumference of the disc are positioned respective members of pairs of projecting pins or dowels 13 (shown in FIG. 2). The pins or dowels 13 project above the surface of the rotatable disc 2 by an amount substantially equal to the thickness of the gaming chips which are to be sorted.

In use, used gaming chips are fed randomly into the hopper 1 via the open top 1*a* and then fall under gravity to the lowermost portion of the hopper 1*b*. The rotating disc 2 communicates directly with the base of the hopper 1*b*, and gaming chips are swept from the base of the hopper by engagement of chips with the pairs of projecting pins 13 such that each respective pair of pins 13 carries a single gaming chip resting thereon away from the hopper as the disc 2 rotates. Since the plane of the disc 2 is at an acute angle with respect to a nominal datum surface perpendicular to the direction of gravitational acceleration, the individual chips rest on each pair of pins with the planar surface of the chips resting on the planar surface of the disc 2 either side of the circumferential rectangular slot 12.

Upon approaching the highest point of rotation of the disc 2, the arc of travel of the respective gaming chips passes along a guide channel 14 (defined by the dashed lines in FIG. 2) provided in an exchange plate 15. The lowermost wall of the guide channel 14 prevents the chips from falling off the pins 13 under the influence of gravity. The exchange plate 15 is provided with a substantially oval/rectangular aperture 16 in the region of the uppermost extent of the disc 2. An elongate finger plate 17 connected at one end to the exchange plate 15 extends toward the centre of the aperture 16, and away from the plane of the exchange plate 15 towards the planar surface of the disc 2 such that the distal end 17*a* of the finger plate 17 is positioned in the circumferential slot 12 provided on the disc 2.

As the disc 2 rotates (in the direction shown by arrow A in FIG. 2) gaming chips 18 (shown in the dashed lines in FIG. 2) which have been supported on respective pairs of pins 13 on their upward arcing path pass along the guide channel 14 until the leading edge of the chip 18 contacts the surface of the distal end of the finger 17, which extends into the slot 12.

Further rotation of the disc 2 causes the chip 18 to be "lifted" from the surface of the disc 2 and forced through the aperture 16 (i.e out of the plane of the paper in FIG. 2).

Figure 3:
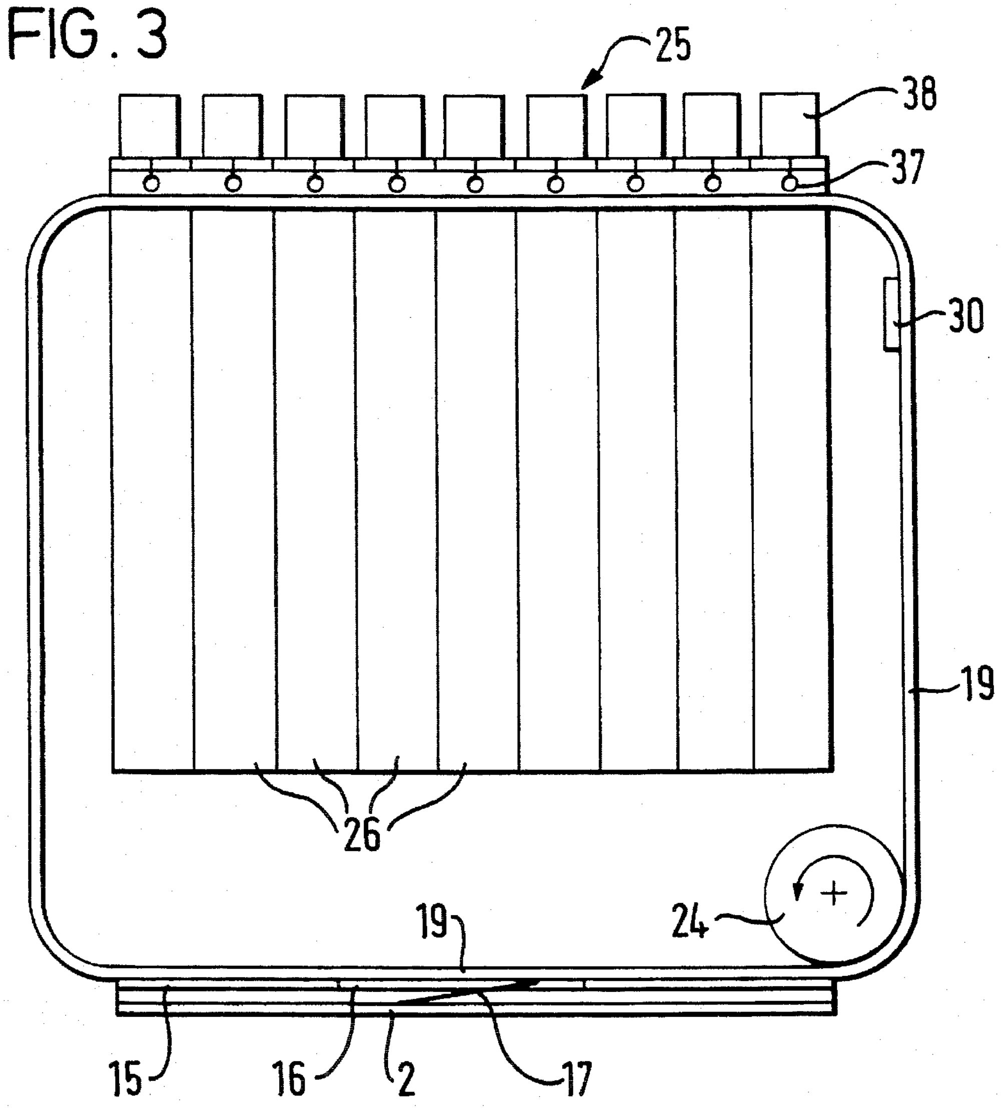
FIG. 3 is a schematic plan view of the apparatus of FIGS. 1 and 2.
Figure 4:
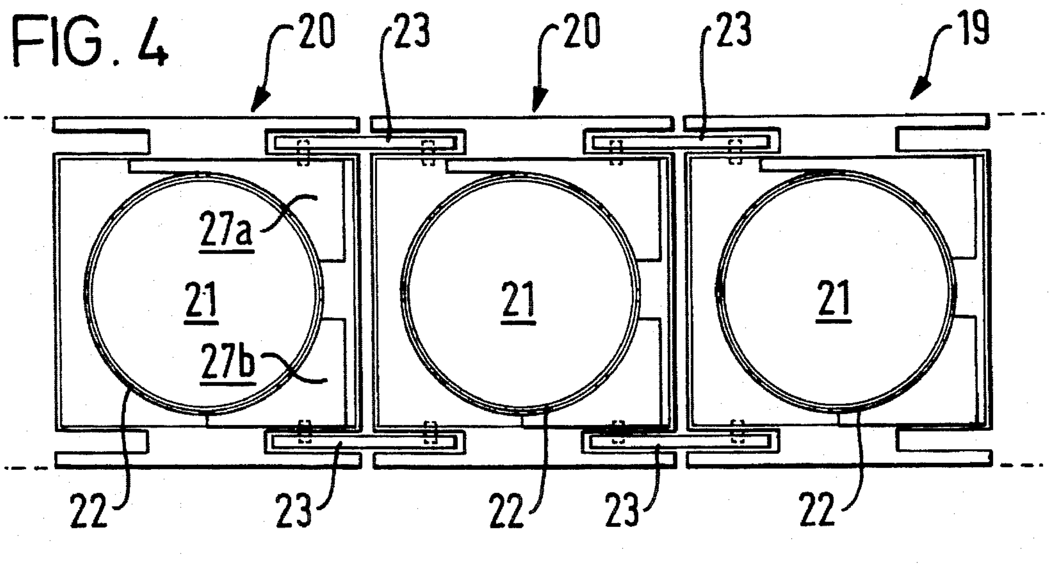
FIG. 4 is a schematic view of a part of the apparatus of FIGS. 1 to 3.
Figure 5:
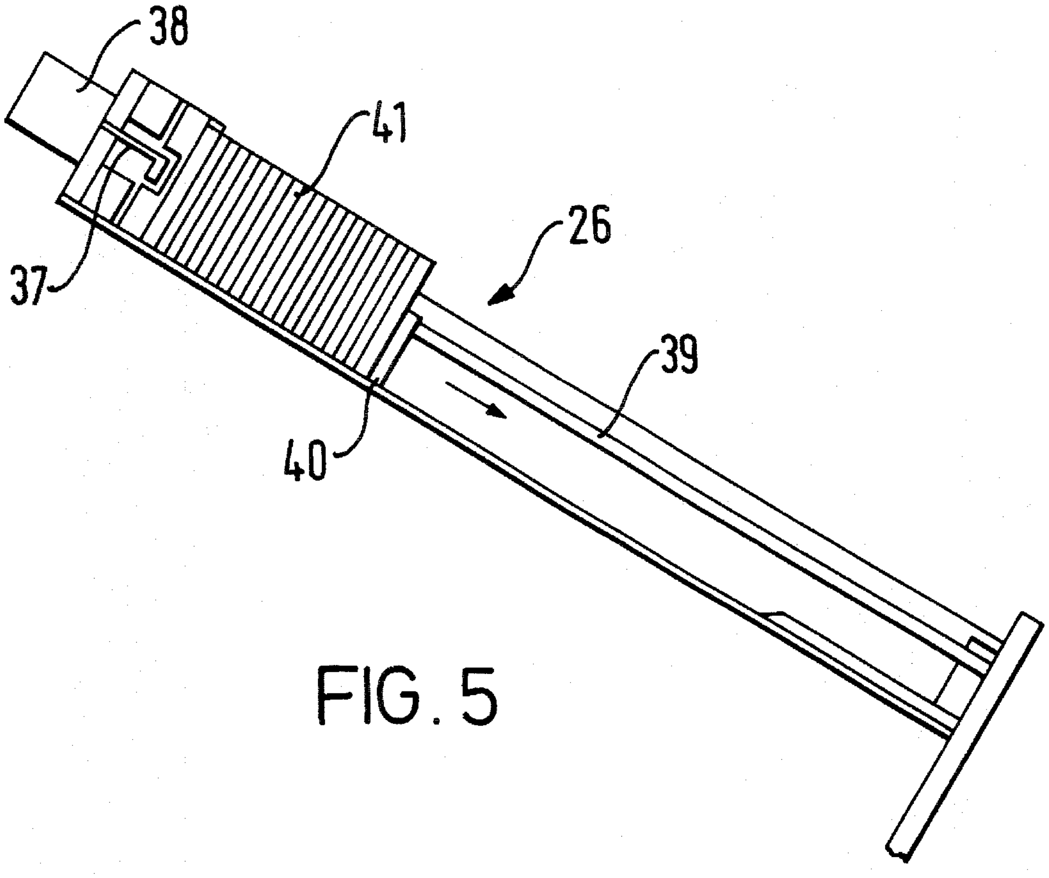
FIG. 5 is a sectional view of a part of the apparatus of FIGS. 1 to 4.

Referring now to FIGS. 3 and 4 also, immediately adjacent the aperture 16 in the exchange plate 15 is a linearly running portion of a closed loop conveyor 19. As most clearly shown in FIG. 4, the conveyor 19 comprises a number of upstanding substantially rectangular chip collectors 20 each being provided with a central circular aperture 21 arranged to receive and locate a single respective chip. The periphery of each aperture 21 is provided with a circular ring 22 of a resiliently deformable plastics material to aid in securely locating the respective chip. Adjacent chip collectors 20 are pivotally connected to one another by means of pivotal connector bars 23 such that each collector may pivot relative to its adjacent collector along their immediately adjacent edges. A drive wheel 24 geared to drive motor 6 causes the conveyor 19 to follow a substantially square path having substantially parallel opposed linearly running portions, one passing adjacent the exchange plate 15 and the other passing intermediate a chip ejector array 25 and a downwardly sloping array of chip stacking columns 26.

As the chip collectors 20 comprising the conveyor 19 pass adjacent the aperture 16 in the exchange plate 15, a respective chip 18 which has been lifted from the disc 2 by the finger 17 is forced through the aperture 16 when it is collected by a respective passing collector 20. Each collector is provided with upstanding guide portions 27*a*, 27*b*, which serve to securely intercept the respective chip 18 and ensure that it is forced into and retained in the aperture 21 in the collector by the finger 17.

It should be noted that the velocity of the conveyor 19 and the tangential velocity of the disc 2 are matched by suitable microprocessor control means (not shown). This ensures that as each respective chip 18 is lifted from the surface of the disc 2 and forced through the aperture 16 in the exchange plate 15 by the finger 17, a corresponding collector 20 is in position passing the aperture 16 to collect and retain the respective chip 18.

Figure 6:
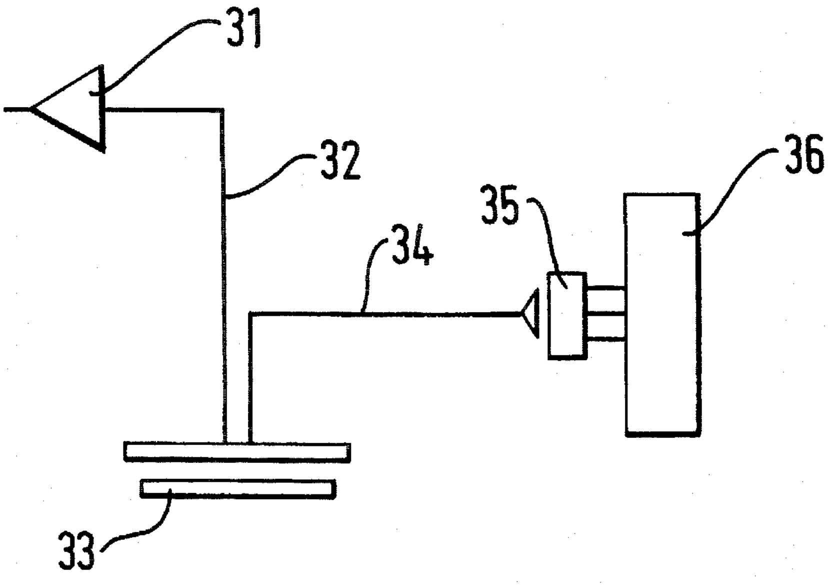
FIG. 6 is a schematic view of sensing apparatus according to the second aspect of the invention.

Once past the exchange plate 15, the conveyor 19 follows a linearly upwardly sloping path towards the chip ejector array 25, near the uppermost portion of the upwardly sloping path, the collectors 20 containing respective chips are brought in succession past a sensing head 30. As can best be seen from FIG. 6, the sensing head 30 comprises a light source 31 which focusses light into a fibre optic bundle 32. The light is transmitted down the fibre bundle 32 and onto the surface of a passing chip 33. Light is reflected off the surface of the passing chip 33 and back up a second fibre optic bundle 34. The reflected light is then focussed onto the surface of a charge coupled device 35 which produces an output signal dependent on the colour of the chip passing the sensing head 30 which signal is transmitted to a main processing unit 36 where the information is stored in digital code.

Having passed the sensing head, the conveyor 19 changes direction and travels along its uppermost linear path between the chip ejector array 25 and the chip stacking columns 26. The chip ejector array comprises a plurality of solenoid actuated ejector members 37 corresponding in number to the number of respectively adjacent chip stacking columns 26. The actuation of the ejector members 37 in the ejector array is microprocessor controlled using the chip colour information stored in main processing unit 36 together with stored information relating to the speed of the conveyor to ensure that the correct solenoid member 38 is actuated when the correct colour chip is in position passing over the correct corresponding chip stacking column 26.

When actuated, the ejector member 37 pushes the chip out of the circular aperture 21 in the respective chip collector 20 and into the correct chip stacking column 26 corresponding to that colour, where the ejected chip becomes the uppermost chip on that particular stack. The stacking columns 26 are downwardly sloping and provided within a boundary defined by the conveyor 19. In each column 26, the chips are supported on a plate 40 which is supported on a movable support rod 39 such that with the additional stacking of each chip, the stack 41 is incremented downwards.

I claim:

1. Apparatus for sorting a plurality of differently identified gaming chips, said apparatus comprising transfer means arranged to remove individual ones of said chips from a store of randomly arranged chips and transfer said chips in sequence to conveyor means, said conveyor means being located above said transfer means and arranged to carry said chips in sequence first to sensing means arranged to sense an identifiable characteristic of said individual chips, and subsequently to chip ejector means arranged to remove individual ones of said chips from said conveyor means and deposit individual said chips in a respective selected one of a plurality of receptacles depending on the characteristic of said individual chip identified by said sensing means, said transfer means comprising a substantially planar disc having a central axis and being rotatable about said central axis, the plane of the disc being inclined at an acute angle to the horizontal.

2. Apparatus according to claim 1, wherein said disc is provided with a plurality of projecting formations spaced circumferentially around and proximate the periphery of said disc, said formations being arranged to carry respective chips from said store to said conveyor means as said disc rotates about said axis.

3. Apparatus according to claim 2 wherein the projecting formations comprise pins arranged in pairs, each pair of pins being arranged to carry a respective individual chip.

4. Apparatus according to claim 1, wherein the disc is rotatably driven.

5. Apparatus according to claim 4 wherein the speed of rotation of the disc is adjustable.

6. Apparatus according to claim 1, further provided with deflector means arranged to lift individual ones of said chips from said first transfer means and position said chips in/on said conveyor means.

7. Apparatus according to claim 6, wherein said deflector means comprises an elongate finger arranged to lift and deflect said chips from the surface of said rotating disc.

8. Apparatus according to claim 7, wherein a circular groove or slot is provided proximate said periphery of said disc within which the distal end of said finger member is received.

9. Apparatus according preceding claim 1, wherein said conveyor means comprises a plurality of chip collector apertures adapted to collect and retain respective individual ones of said chips.

10. Apparatus according to claim 9, wherein one or more resiliently deformable elements are provided around respective collector apertures such that respective chips are securely retained therein.

11. Apparatus according to claim 9, wherein said collector apertures are shaped and dimensioned such that the respective chips enter and are located in said aperture from one side of the aperture and the ejected through the opposed side of the respective aperture.

12. Apparatus according to claim 9, wherein said conveyor comprises a plurality of linked elements, each element being provided with an individual chip retaining aperture.

13. Apparatus according to claim 12, wherein said conveyor elements are pivotally linked such that adjacent elements may pivot relative to one another.

14. Apparatus according to claim 1, wherein the speed of the conveyor means and transfer means is monitored and controlled such that the speed of the conveyor means and the speed of the transfer means is maintained substantially identical.

15. Apparatus according to claim 1, wherein said chip ejector means comprises an array of chip ejectors arranged in side by side relationship.

16. Apparatus according to claim 15, wherein the chip ejectors are solenoid actuated.

17. Apparatus according to claim 15, wherein a corresponding receptacle is provided adjacent each chip ejector with the path of the conveyor means lying intermediate the chip ejector and respective receptacle.

18. Apparatus according to claim 1, wherein said chip ejector means is actuable in response to an actuation signal provided by signal processing means acting on an output signal from said sensing means.

19. Apparatus according to claim 1, wherein the sensing means comprises a charge coupled device arranged to produce a digital output dependent on the color of the chip being sensed.

20. An apparatus according to claim 1, wherein:

said transfer of said chips from said transfer means to said conveyor occurs at substantially the highest point on said transfer means.

21. Apparatus for sorting a plurality of differently identified gaming chips, said apparatus comprising transfer means arranged to remove individual ones of said chips from a store of randomly arranged chips and transfer said chips in sequence to conveyor means, said conveyor means being arranged to carry said chips in sequence first to sensing means arranged to sense an identifiable characteristic of said individual chips, and subsequently to chip ejector means arranged to remove individual ones of said chips from said conveyor means and deposit individual said chips in a respective selected one of a plurality of receptacles depending on the characteristic of said individual chip identified by said sensing means, said transfer means comprising a substantially planar disc having a central axis and being rotatable about said central axis, the plane of the disc being inclined at an acute angle to the horizontal, said disc being provided with a plurality of projecting pins arranged in respective pairs around the periphery of the disc each pair arranged to carry a respective individual chip from said store to said conveyor means as said disc rotates about said axis.

* * * * *